United States Patent [19]

Kanehara et al.

[11] Patent Number: 4,688,425
[45] Date of Patent: Aug. 25, 1987

[54] DIRECT-HEATED FLOW MEASURING APPARATUS HAVING FILM RESISTOR

[75] Inventors: Kenji Kanehara, Aichi; Seizi Huzino, Anjo; Kazuhiko Miura, Aichi; Minoru Ohta, Okazaki, all of Japan

[73] Assignee: Nippon Soken, Inc., Nishio, Japan

[21] Appl. No.: 830,880

[22] Filed: Feb. 19, 1986

[30] Foreign Application Priority Data

Feb. 20, 1985 [JP] Japan .................................. 60-30199

[51] Int. Cl.⁴ .......................................... G01M 15/00
[52] U.S. Cl. ...................................... 73/204; 73/118.2
[58] Field of Search ................ 73/118.2, 204; 123/494

[56] References Cited

U.S. PATENT DOCUMENTS 4,279,146 7/1981 Wessel et al. ...................... 73/118.2

FOREIGN PATENT DOCUMENTS 14915 2/1981 Japan .................................. 73/204

Primary Examiner—Jerry W. Myracle
Attorney, Agent, or Firm—Cushman, Darby & Cushman

[57] ABSTRACT

In a direct-heated flow measuring apparatus including an electric heater of a film resistor type and a temperature-detecting resistor for detecting the temperature within a passage, the flow rate thereof is measured by a sensing circuit. The temperatures of the electric heater and the temperature of the temperature-detecting resistor are compared. The measuring operation of the sensing circuit is stopped when the temperature within the passage is abnormal as indicated by this comparison.

17 Claims, 12 Drawing Figures

OUTPUT OF
CRANK ANGLE
SENSOR 14

OUTPUT OF
OR CIRCUIT
703

$V_Q$

DIRECT-HEATED FLOW MEASURING APPARATUS HAVING FILM RESISTOR

BACKGROUND OF THE INVENTION (1) Field of the Invention

The present invention relates to a direct-heated flow measuring apparatus having a film resistor which serves as a temperature detecting means as well as an electric heater. Such a direct-heated flow measuring apparatus can be used, for example, for measuring the flow rate of engine intake air.

(2) Description of the Related Art

Generally, in an internal combustion engine, the amount of intaker air is one of the most important parameters for controlling the fuel injection amount, ignition timing, and the like. A gas-flow measuring apparatus, i.e., an airflow meter, is provided for measuring the same. One of the more common prior art airflow meters is the vane-type, which is, however, disadvantageous in scale, response speed characteristics, and the like. Recently airflow meters having temperature-dependent resistors have been developed, which are advantageous in scale, response speed characteristics, and the like.

There are two types of airflow meters having temperature-dependent resistors, i.e. the heater-type and direct-heated type. The heater-type airflow meter may consist of an electric heater resistor provided in an intake-air passage of an engine and two temperature-dependent resistors arranged on the upstream and downstream sides of the electric heater resistor. In this case, the temperature-dependent resistor on the downstream side is used for detecting the temperature of air heated by the heater resistor, while the temperature-dependent resistor on the upstream side is used for detecting the temperature of non-heated air.

In the heater-type airflow meter, the current flowing through the heater resistor is controlled for a constant difference in temperature between the two temperature-dependent resistors, thereby detecting the voltage applied to the heater resistor as the mass flow rate of air. In this heater-type airflow meter, if no temperature-dependent resistor upstream is provided and the current of the heater resistor is controlled for a constant temperature of the downstream temperature-dependent resistor, the voltage applied to the heater resistor is detected as the volume flow rate of air.

Also, the heater-type airflow meter can be controlled by a trigger pulse. That is, when such a system is employed, a trigger pulse is given to initiate heating of the heater resistor. Then, the heating of the heater resistor continues until a constant difference in temperature between the two temperature-dependent resistors is generated, or until the downstream temperature-dependent resistor reaches a constant value. In this case, the heating time period is detected as the mass flow rate of air of the volume flow rate of air. Such a trigger pulse control has an advantage in that the power dissipation is good.

On the other hand, the direct-heated type airflow meter may consist of a film resistor which serves not only as an electric heater, but also a temperature-detecting means for detecting the temperature of the heated air. Also, the direct-heated type airflow meter may consist of a temperature-dependent resistor for detecting the temperature of non-heated air. Thus, the current flowing through the film resistor is controlled for a constant difference in temperature between the film resistor and the temperature dependent resistor, thereby detecting the voltage applied to the film resistor as the mass flow rate of air. In this direct-heated type airflow meter, too, if no temperature-dependent resistor is provided and the current of the heater resistor is controlled for a constant temperature of the film resistor, the voltage applied to the film resistor is detected as the volume flow rate of air. Note that the above-mentioned trigger pulse control is possible also in the direct-heated airflow meter.

Since the film resistor of the direct-heated type airflow meter serves as a temperature-detecting means for heated air, that is, no additional temperature detecting means for heated air is necessary, the direct-heated type airflow meter is smaller in size than the heater-type airflow meter.

In the direct-heated type airflow meter, one of the film resistors may consist of heat-resistant resin such as a polyimid film, and a metal foil adhered thereto by adhesives, and another of the film resistors may consist of an insulating substrate such as a ceramic or monocrystalline silicon. In the former film resistor, although the heat-resistant temperature of the polyimid film is about 400° C., the heat-resistant temperature of adhesives for high temperatures is about 250° C. However, as shown in FIG. 1, if this airflow meter is used in an internal combusion engine, the temperature of the film resistor is normally controlled within a range of the ambient temperature +(100° to 150° C.), i.e., within a range of 60° C. to 210° C. However, in an abnormal state such as backfiring, the ambient temperature, which is the same as that of the temperature-dependent resistor, may be higher than 200° C., and as a result, the temperature of the film resistor may be higher than 300° C. Thus, during an abnormal state, the film resistor may be exposed to a temperature higher than 250° C. for a long time, so that the polyimid film as well as the adhesives are contracted or deformed, thereby reducing the accuracy of the measured flow rate of air. Also, in an airflow meter using the latter film resistor, the resistance of the resistance pattern may be changed due to the distortion of the substrate such as a ceramic or monocrystalline silicon during an abnormal state, thereby also reducing the accuracy of the measured flow rate of air.

SUMMARY OF THE INVENTION

It is an object of the present invention to provide a direct-heated flow measuring apparatus having a film resistor in which overheating of the film resistor is avoided.

According to the present invention, in a direct-heated flow measuring apparatus including an electric heater of a film resistor type and a temperature-detecting resistor for detecting the temperature within a passage, the flow rate thereof is measured by a sensing circuit in accordance with the temperature of the electric heater and the temperature of the temperature-detecting resistor. The measuring operation of the sensing circuit is stopped when the temperature within the passage is abnormal. As a result, in an abnormal state such as backfiring, since the measuring operation of the sensing circuit is stopped, the temperature of the film resistor is reduced, thereby preventing it from being overheated.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Figure 1:
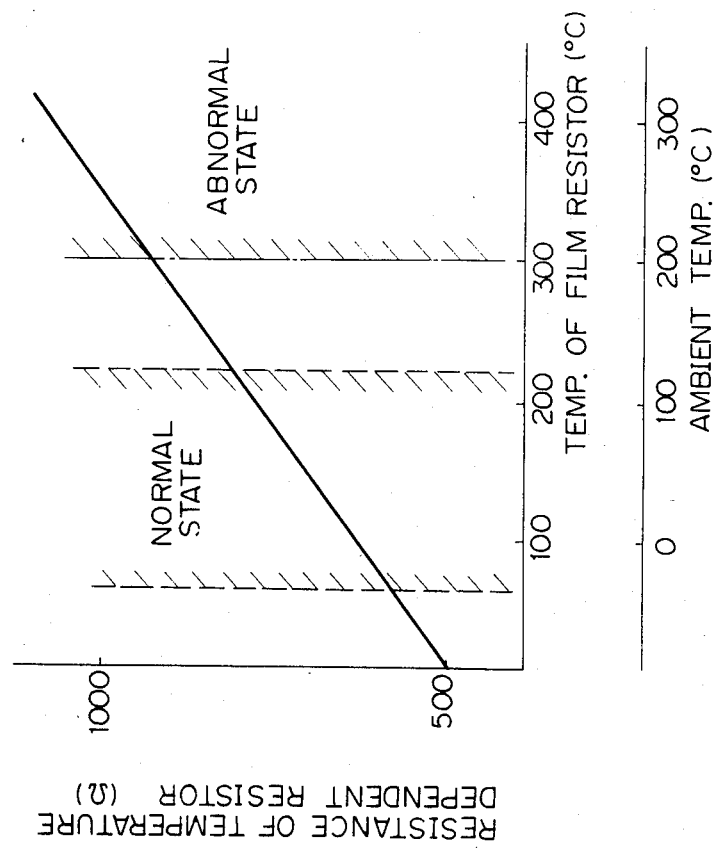
FIG. 1 is a diagram showing the temperature characteristics of a temperature-dependent resistor.
Figure 2:
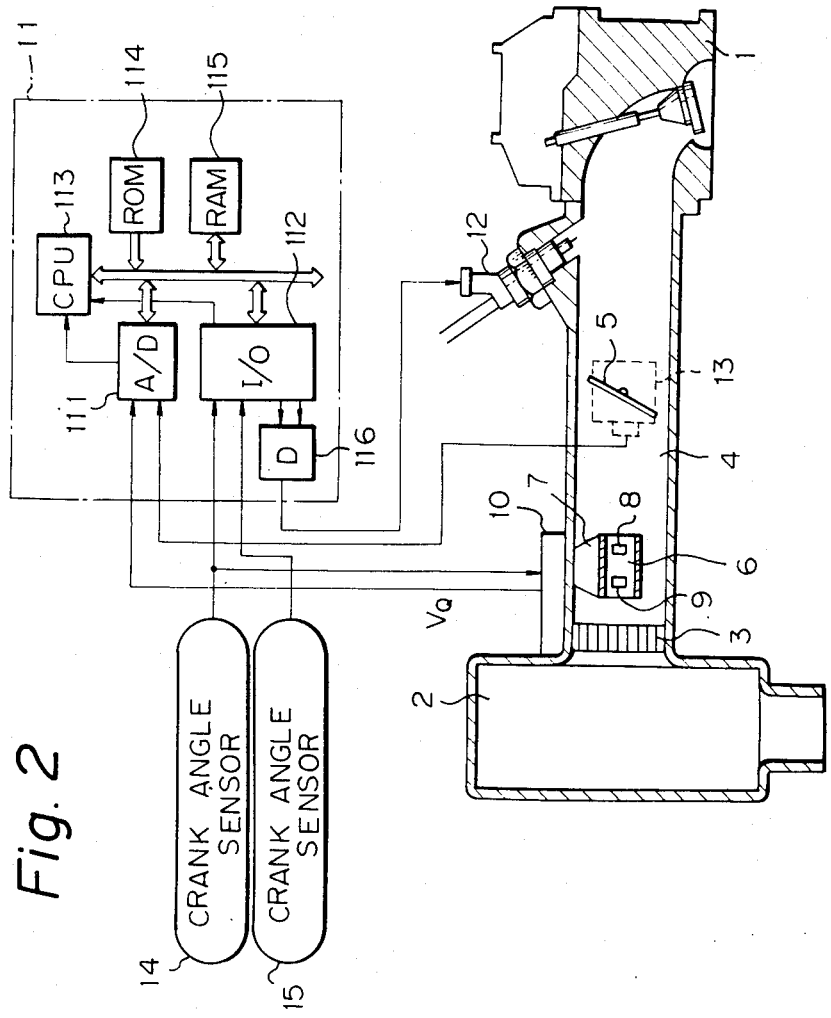
FIG. 2 is a schematic diagram showing the overall configuration of an internal combustion engine including a direct-heated type flow measuring apparatus according to the present invention.

In FIG. 2 which illustrates the overall configuration of an internal engine including a flow measuring apparatus according to the present invention, reference numeral 1 designates a spark ignition engine for driving an automobile in which air for combustion is sucked through an air cleaner 2, a rectifier grid 3 for making the air flow uniform, and an intake air passage 4. Provided in the intake air passage 4 is a throttle valve 5 arbitrarily operated by a driver. The flow measuring apparatus is provided in the intake air passage 4 between the rectifier grid 3 and the throttle valve 5.

The flow measuring apparatus includes a sensing portion inside of the intake air passage 4 and a sensing circuit 10 outside of the intake air passage 4. The sensing portion includes a measuring tube (or duct) 6 fixed by a stay 7 to the intake air passage 4. A film resistor 8 and a temperature-dependent resistor 9 for detecting the temperature of non-heated air are provided inside of the duct 6. In this case, the temperature-dependent resistor 9 is not substantially affected by the heat generated from the film resistor 8. Note that the temperature-dependent resistor 9 can be provided outside of the duct 6. The film resistor 8 and the temperature-dependent resistor 9 are connected to the sensing circuit 10 mounted in a hybrid board.

For example, the sensing circuit 10 controls the current flowing to the film resistor 8 to generate heat for a constant difference such as 100° C. in temperature between the film resistor 8 and the temperature-dependent resistor 9. Also, the sensing circuit 10 generates an output voltage $V_Q$ and transmits it to a control circuit 11. The sensing circuit 10 will be explained later.

The control circuit 11, which is, for example, a microcomputer, is comprised of a multiplex-incorporating analog/digital (A/D) converter 111, an input/output (I/O) interface 112, a central processing unit (CPU) 113, a read-only memory (ROM) 114, a random-access memory (RAM) 115, a driver 116 for driving a fuel injector 12, and the like. Note that the A/D converter is an integration type, and therefore, after every A/D conversion is completed, an interrupt signal is transmitted from the A/D converter 111 to an interrupt terminal of the CPU 113.

Reference numeral 13 designates a throttle opening sensor provided at the axis of the throttle valve 5. The throttle opening sensor 13 generates an analog voltage in proportion to the opening of the throttle valve 5 and transmits it to the A/D converter 111 of the control circuit 11. Also, disposed in the distributor (not shown) are crank angle sensors 14 and 15 for detecting the angle of the crankshaft (not shown) of the engine 1. In this case, the crank angle sensor 14 generates a pulse signal at every 180° crank angle (CA) while the crank-angle sensor 15 generates a pulse signal at every 30° CA. The pulse signals of the crank angle sensors 14 and 15 are supplied to the I/O interface 112 of the control circuit 11. In addition, the pulse signal of the crank angle sensor 15 is then supplied to an interruption terminal of the CPU 105.

Figure 3:
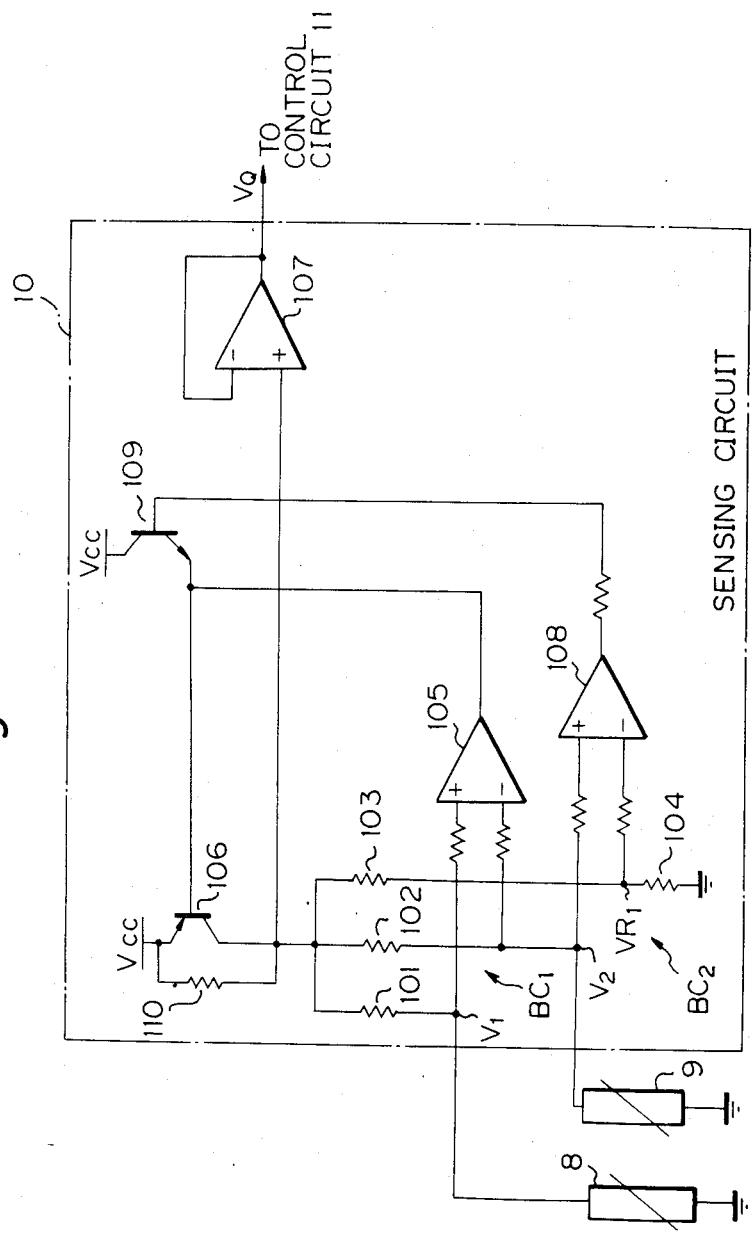
FIGS. 3 and 4 are circuit diagrams of examples of the sensing circuit of FIG. 2.

In FIG. 3, which is a first example of the sensing circuit 10 of FIG. 2, resistors 101 and 102 form a first bridge circuit $BC_1$, with the film resistor 8 and the temperature-dependent resistor 9, and resistors 103 nd 104 as well as the resistor 102 form a second bridge circuit $BC_2$ with the temperature-dependent resistor 9. In this case, the resistor 102 and the temperature-dependent resistor 9 are common to the first and second bridge circuits $BC_1$ and $BC_2$.

The potentials $V_1$ and $V_2$ at the diagonal points of the first bridge circuit $BC_1$ are compared by a comparator 105 as detecting means. That is, the comparator 105 detects whether or not the temperature of the film resistor 8 is higher than the temperature of the temperature-dependent resistor 9 by a constant value such as 100° C. The output of the comparator 105 controls the conductivity of a power transistor 106. In this case, the first bridge circuit $BC_1$, the comparator 105, and the power transistor 106 form a feedback loop, to control the heat generated by the film resistor 8 so that the difference in potential between the film resistor 8 and the temperature-dependent resistor 9 is constant, for example, 100° C. That is, when the amount of air flowing through the intake air passage 4 increases, thus reducing the temperature of the film resistor 8, which, in this case, serves as a thermistor, the resistance value thereof decreases so as to satisfy the following condition:

$$V_1 < V_2$$

where $V_1$ is the potential at the node between the resistor 101 and the film resistor 8 and $V_2$ is the potential at the node between the resistor 102 and the temperature-dependent resistor 9. As a result, the output potential of the comparator 105 is reduced, thereby increasing the conductivity of the transistor 106. Therefore, the heat generated by the film resistor 8 is increased and, simultaneously, the collector potential of the transistor 106 is increased so that the output voltage $V_Q$ of a voltage buffer 107 is also increased.

Contrary to this, when the amount of air flowing through the intake air passage 4 decreases, thus increasing the temperature of the film resistor 8, the resistance value thereof increases so as to satisfy the following condition:

$$V_1 > V_2$$

As a result, the output potential of the comparator 105 is increased, thereby decreasing the conductivity of the transistor 106. Therefore, the heat generated by the film resistor 8 is decreased and, simultaneously, the collector potential of the transistor 106 is decreased, so that the output voltage $V_Q$ of the voltage buffer 107 is also decreased.

Thus, feedback control is performed upon the temperature of the film resistor 8 for a constant difference in temperature between the film resistor 8 and the temperature-dependent resistor 9. Therefore, the output voltage $V_Q$ of the output buffer 107 indicates the amount of air flowing through the intake air passage 4 at the position where the film resistor 8 is located.

The potentials $V_2$ and $VR_1$ at the diagonal points of the second bridge circuit $BC_2$ are compared by a comprator 108 as a detecting means. That is, the comparator 108 detects whether or not the temperature of the temperature-dependent resistor 9 is higher than a value such as 150° C. determined by the voltage $VR_1$. The output of the comparator 108 controls a transistor 109. For example, when the temperature of the temperature-dependent resistor 9 is smaller than 150° C., $V_2 < VR_1$, so that the transistor 109 is in an off state which does not affect the operation of the feedback loop formed by the first bridge circuit $BC_1$, the comparator 105, and the power transistor 106. Contrary to this, when the temperature of the temperature-dependent resistor 9 becomes higher than 150° C., $V_2 > VR_1$, so that the transistor 109 is turned on, thereby forcibly turning off the power transistor 106. As a result, the feedback loop formed by the first bridge circuit, the comparator 105, and the power transistor 106 is opened. In this case, only a predetermined current is supplied via a resistor 110 to the collector of the power transistor 106, thereby reducing the heat generated from the film resistor 8.

Figure 4:
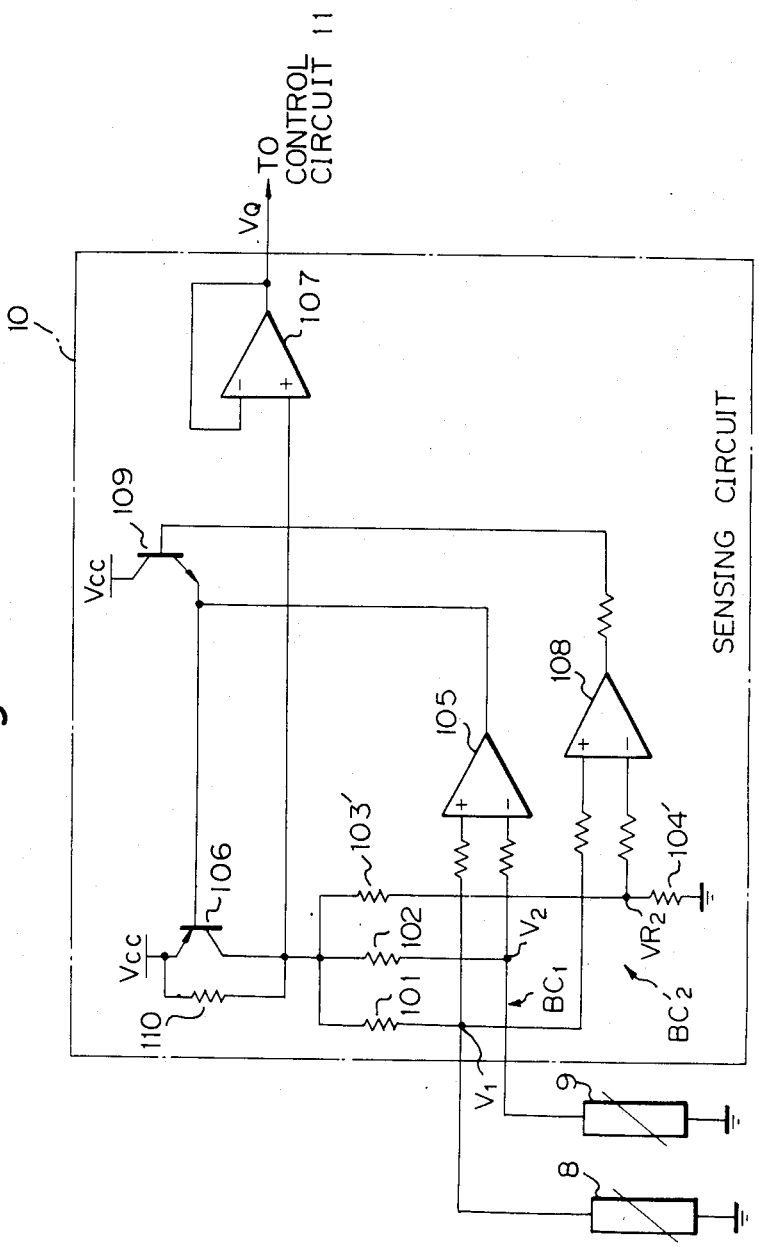

In FIG. 4, which is a second example of the sensing circuit 10 of FIG. 2, resistors 103' and 104' as well as the resistor 102 form a second bridge circuit $BC_2'$ with the temperature-dependent resistor 9. In this case, the resistor 101 and the film resistor 8 are common to the first and second bridge circuits $BC_1$ and $BC_2'$. Therefore, the feedback loop formed by the first bridge circuit $BC_1$, the comparator 105, and the power transistor 106 operates in the same way as in FIG. 3.

The potentials $V_1$ and $VR_2$ at the diagonal points of the second bridge circuit $BC_2'$ are compared by the comparator 108 as a detecting means. That is, the comparator 108 detects whether or not the temperature of the film resistor 8 is higher than a value such as 250° C. determined by the voltage $VR_2$. For example, when the temperature of the film resistor 8 is smaller than 250° C., $V_1 < VR_2$, so that the transistor 109 is in an off state which does not affect the operation of the feedback loop formed by the first bridge circuit $BC_1$, the comparator 105, and the power transistor 106. Contrary to this, when the temperature of the film resistor 8 becomes higher than 250° C., $V_1 > VR_2$, so that the transistor 109 is turned on, thereby forcibly turning off the power transistor 106. As a result, the feedback loop formed by the first bridge circuit, the comparator 105, and the power transistor 106 is opened. In this case, only a predetermined current is supplied via the resistor 110 to the collector of the power transistor 106, thereby reducing the heat generated from the film resistor 8.

Thus, when the temperature of the temperature-dependent resistor 9 is higher than 150° C., or when the temperature of the film resistor 8 is higher than 250° C., the feedback control for the heat generated by film resistor 8 is opened (stopped), and as a result, the sensing output voltage $V_Q$, which is, in this case, nearly 0V, is transmitted to the control circuit 11.

The operation of the control circuit 11 will be explained with reference to FIGS. 5 and 6. Note that, in this case, the flowcharts of FIGS. 5 and 6 are used for controlling the fuel injection.

Figure 5:
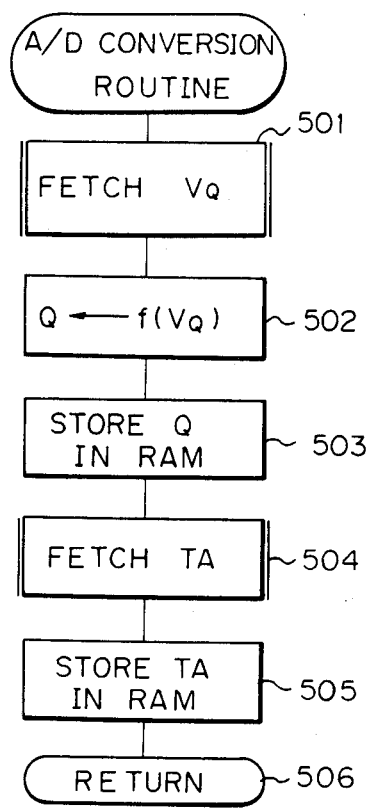
FIGS. 5 and 6 are flowcharts for showing the operation of the control circuit of FIG. 2 where the sensing circuit of FIG. 3 or 4 is used.

Referring to FIGS. 5, which is an A/D conversion routine executed at every predetermined time period, at step 501, an A/D conversion is performed upon the sensing voltage $V_Q$ of the sensing circuit $V_Q$, and at step 502, the A/D converted $V_Q$ is converted into intake air amount data Q by using a predetermined function $f(V_Q)$. Then, at step 503, the intake air amount data Q is stored in the RAM 115. At step 504, an A/D conversion is performed upon the angle TA of the throttle valve 5, i.e., the output of the throttle opening sensor 13, and at step 505, the throttle angle data TA is stored in the RAM 115, thereby completing this routine at step 506.

Note that the engine speed Ne is calculated in the interrupt routine (not shown) at every 30° CA. signal of the crank angle sensor 15 and is stored in the RAM 105.

Figure 6:
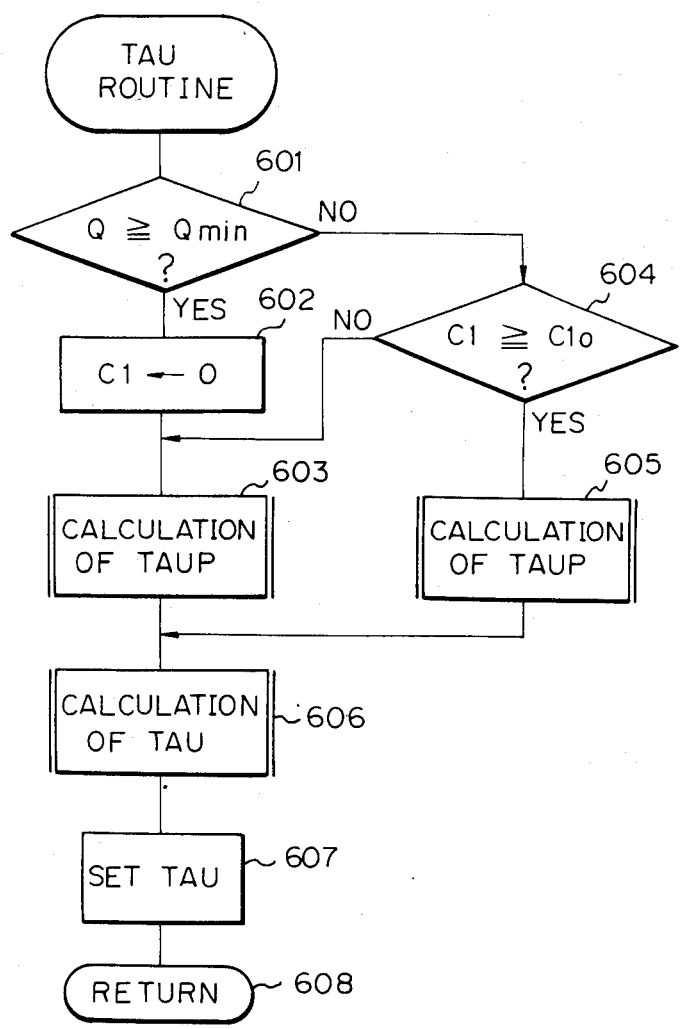

FIG. 6 is a routine for calculating a fuel injection amount executed at predetermined crank angle. That is, at step 601, the intake air amount data Q is read out of the RAM 115, and it is determined whether or not $Q \geq Q_{min}$, where $Q_{min}$ is an allowable minimum value of the intake air amount. That is, if in a normal state, $Q \geq Q_{min}$, and if in an abnormal state such as backfiring, $Q > Q_{min}$. As a result, if $Q \geq Q_{min}$, at step 602, a counter C1 is cleared, and then at step 603, a base fuel amount TAUP is calculated by $$TAUP \leftarrow K \cdot Q/Ne$$

where K is a constant. Note that the counter C1 is counted up by 1 in the timer routine (not shown) executed at every predetermined time period.

Contrary to this, if $Q > Q_{min}$ at step 601, the flow advances to step 604 which determines whether or not $C \geq C_0$, where $C1_0$ is a constant corresponding to 5s, for example. If $C_1 < C_{10}$, the flow advances also to step 603 which calculates a base fuel injection using the data Q and Ne. However, if $C_1 \geq C1_0$, the flow advances to a diagnosis step 605. At step 605, a base fuel amount TAUP is calculated from a two-dimensional map stored in the ROM 113 by using the parameters TA and Ne.

Then, at step 606, the base fuel amount TAUP is corrected as occasion demands, thereby obtaining a final fuel injection amount TAU. At step 607, the final injection amount TAU is set in the counter of the driven 116, and the flow then advances to step 608, thereby completing this routine.

Thus, when the final fuel injection amount TAU is set in the counter of the driver 116, the amount of fuel corresponding to TAU is injected into the combustion chamber of the engine 1.

Note that the determination at step 604 can be replaced by the determination of whether or not the number of executions of the routine of FIG. 6, where $Q > Q_{min}$, is larger than a definite value.

Figure 7:
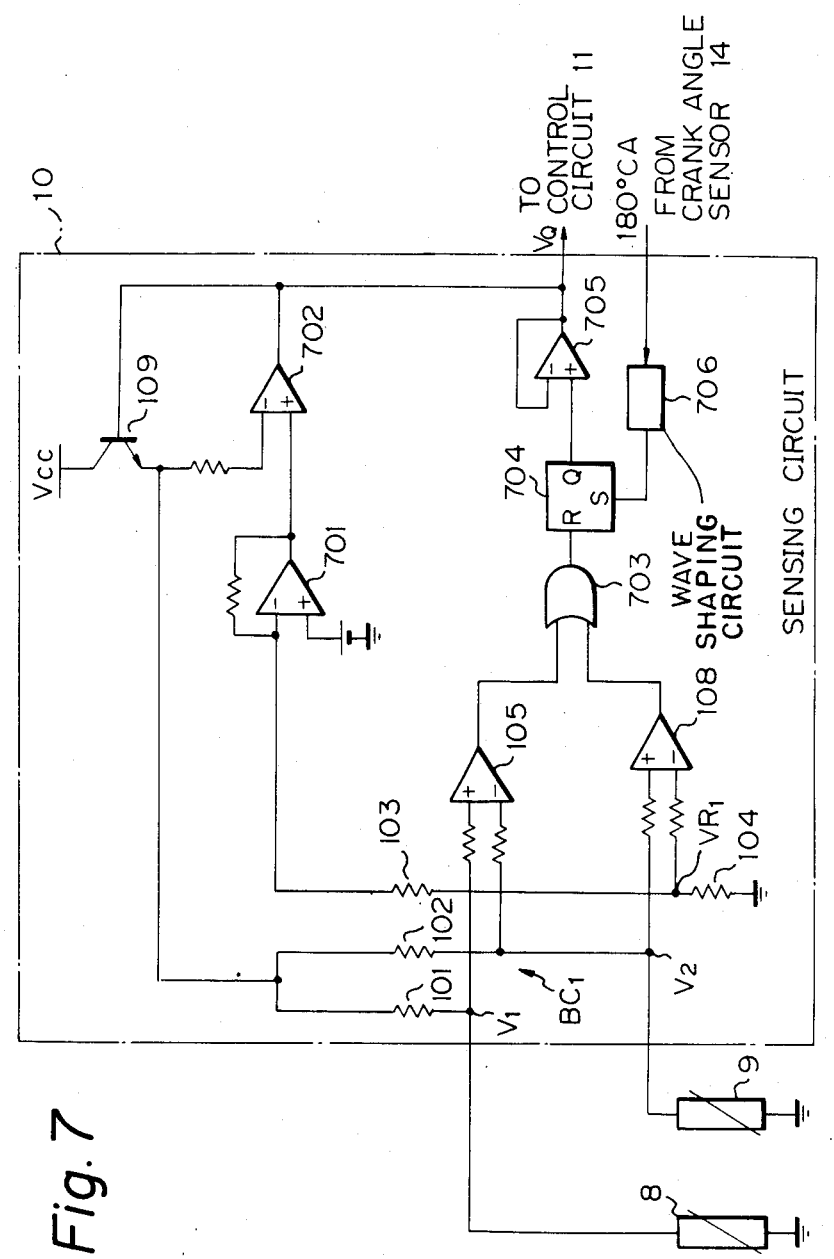
FIGS. 7 and 8 are circuit diagrams of other examples of the sensing circuit of FIG. 2.
Figure 8:
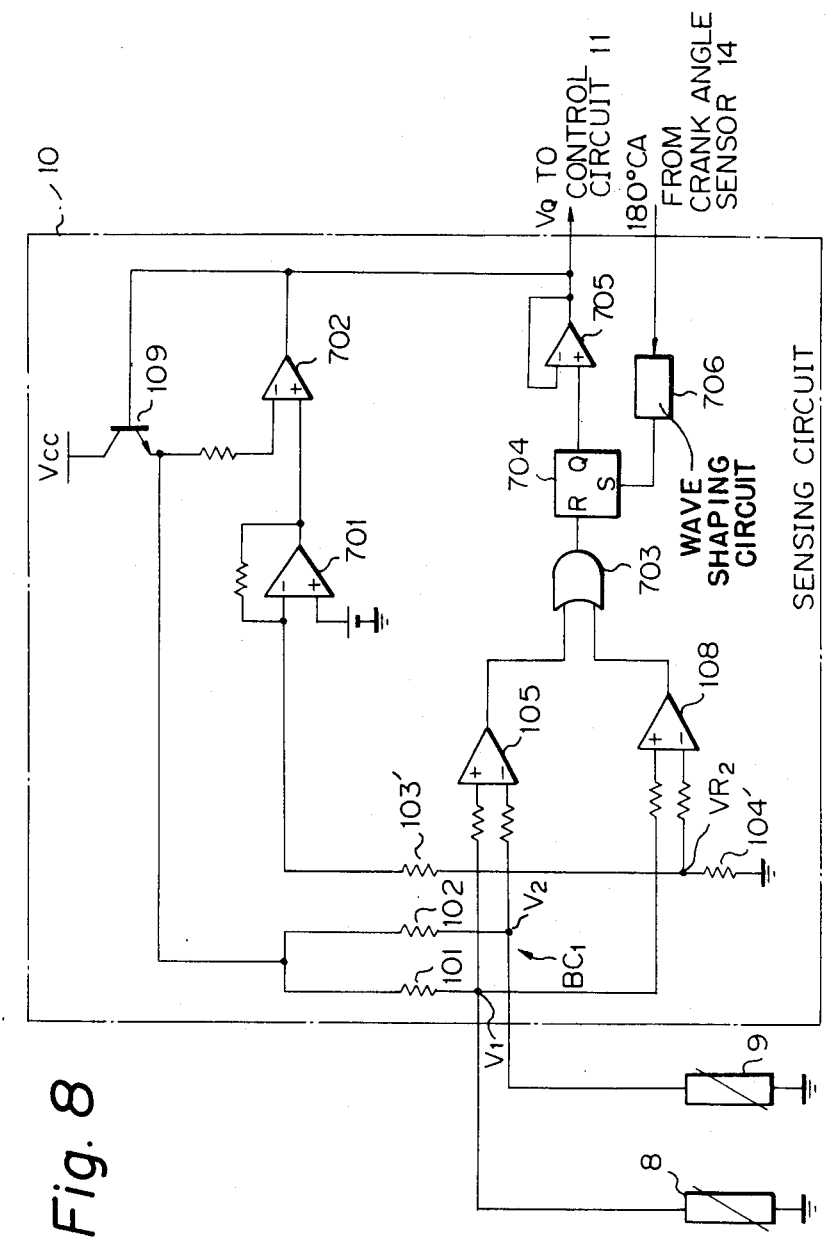

FIGS. 7 and 8 illustrate other examples of the sensing circuit 10 of FIG. 2. Note that FIGS. 7 and 8 are modifications of the sensing circuits of FIGS. 3 and 4, respectively, in order to carry out a trigger pulse control as explained above.

In FIG. 7, the power transistor 106, the voltage buffer 107, and the resistor 110 of FIG. 3 are deleted, and a constant-voltage generating circuit 701, a comparator 702, an OR circuit 703, a flip-flop 704, a voltage buffer 705, and a wave-shaping circuit 706 are added. In this case, the constant-voltage generating circuit 701, the comparator 702, and the transistor 109 are used for applying a constant voltage to the first bridge circuit $BC_1$. Such a constant-voltage application is controlled by the output of the flip-flop 704. That is, when the flip-flop 704 is set, a constant-voltage application is started, and when the flip-flop 704 is reset, this constant-voltage application is ended. Also, supplied to the comparator 105 are the connection potential $V_2$ of the temperature-dependent resistor 9 and the resistor 102, and the connection potential $VR_1$ between the resistors 103 and 104.

The setting of the flip-flop 704 can be carried out at a predetermined time period or at a predetermined crank angle. In FIG. 7, the setting of the flip-flop 704 is carried out by using the 180° CA. signal of the crank angle sensor 14. That is, the setting of the flip-flop 704 is carried at every 180° CA.

In a normal state, the resetting of the flip-flop 704 is carried out by the output of the comparator 105. That is, after power is supplied to the first bridge circuit $BC_1$ by the setting of the flip-flop 704, both of the potentials $V_1$ and $V_2$ at the diagonal points of the first bridge circuit $BC_1$ are increased. As a result, when the temperature of the film resistor 8 becomes higher than the temperature of the temperature-dependent resistor 9 by a constant value such as 100° C., the comparator 105 generates a high-potential output, thereby resetting the flip-flop 704 via the OR circuit 703. Note that the time period T of application of a constant voltage to the first bridge circuit $BC_1$ has the following relationship $T \propto \sqrt{Q}$. Since such a high-voltage output of the comparator 105 is also transmitted as the output Q of the flip-flop 704 ($V_Q$) to the control circuit 11, the control circuit 11 can calculate intake air amount Q by performing a linear transformation upon the time period T, which will be later explained in detail.

In an abnormal state, the resetting of the flip-flop 703 is carried out by the output of the comparator 108. That is, the comparator 108 detects whether or not the temperature of the temperature-dependent resistor 9 is higher than a value such as 150° C. determined by the voltage $VR_1$. For example, when the temperature of the temperature-dependent resistor 9 is smaller than 150° C., $V_2 < VR_1$, the output potential of the comparator 108 is low, which does not affect the operation of the feedback loop formed by the first bridge circuit $BC_1$, the flip-flop 704, the voltage buffer 105, the constant-voltage generating circuit 701, the comparator 702, and the transistor 109. Contrary to this, when the temperature of the temperature-dependent resistor 9 becomes higher than 150° C., $V_2 > VR_1$, so that the flip-flop 704 is reset, thereby forcibly turning off the transistor 109. As a result, the feedback loop is opened, thereby reducing the heat generated from the film resistor 8.

In FIG. 8, the connection potential $V_1$ between the film resistor 8 and the resistor 101 and the connection potential $VR_2$ between the resistors 103' and 104' are supplied to the comparator 108. Therefore, the comparator 108 detects whether or not the temperature of the film resistor 8 is higher than a value such as 250° C. determined by the voltage $VR_2$.

In a normal state, the operation of the circuit of FIG. 8 is the same as that of the circuit of FIG. 7. However, in an abnormal state, when the temperature of the film resistor 8 becomes higher than 250° C., $V_1 > VR_2$, so that the flip-flop 703 is reset, thereby forcibly turning off the transistor 109. As a result, the feedback loop is opened thereby reducing the heat generated from the resistor 8.

Thus, also in FIG. 7 or 8, when the temperature of the temperature-dependent resistor 9 is higher than 150° C., or when the temperature of the film resistor 8 is higher than 250° C., the feedback control 8 is opened (stopped), and as a result, the sensing output voltage $V_Q$, which is high for a very short time period from the time when the flip-flop 704 is set by the output of the crank angle sensor 14 to the time when the flip-flop 704 is reset by the comparator 108, is transmitted to the control circuit 11.

Figure 9:
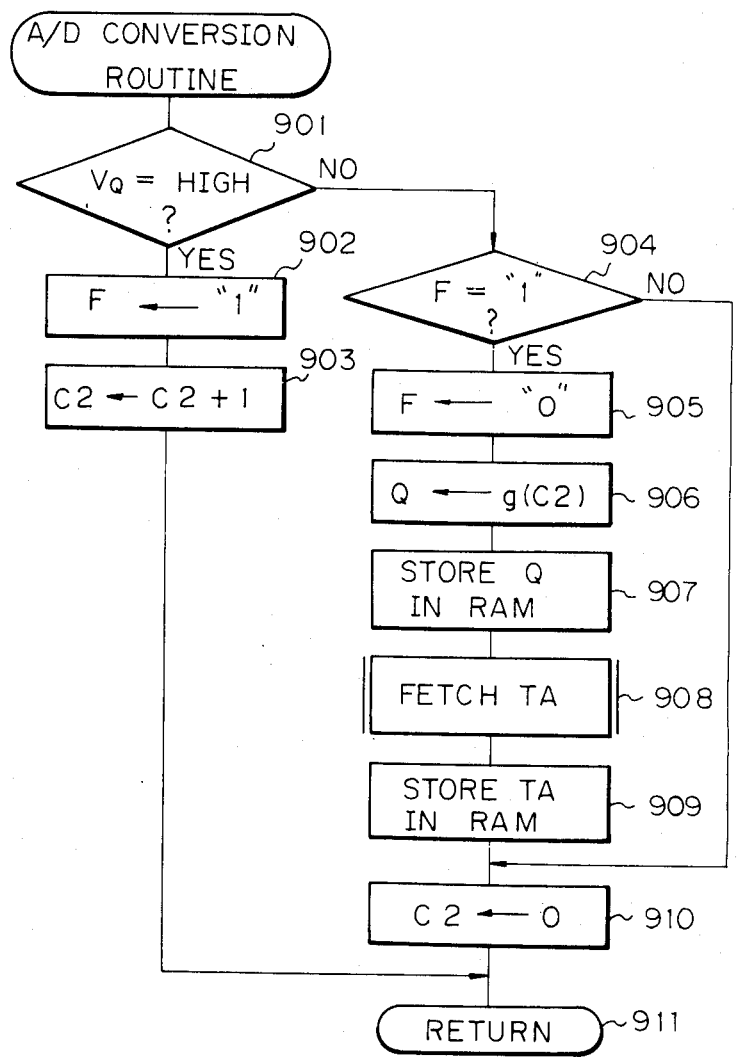
FIG. 9 is a flowchart of the operation of the control circuit of FIG. 2 where the sensing circuit of FIG. 7 or 8 is used.
Figure 10A:
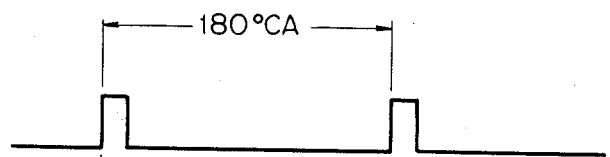
FIGS. 10A, 10B, and 10C are timing diagrams for explaining the flow chart of FIG. 9.
Figure 10B:
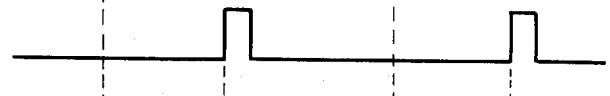
Figure 10C:
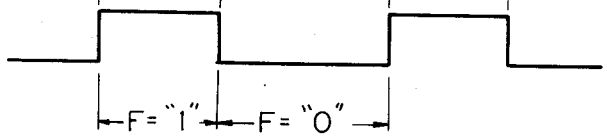

When the circuits as shown in FIGS. 7 and 8 are used as the sensing circuit 10 of FIG. 2, the control circuit 11 carries out the operation as shown in FIGS. 9 and 10 instead of the operation as shown in FIG. 5. Also, in this case, the output voltage $V_Q$ of the sensing circuit 10 is supplied via the I/O interface 112 to an interrupt terminal of the CPU 113, not to the A/D converter 111.

FIG. 9 is an A/D conversion routine for calculating the intake air amount Q and the throttle angle data TA executed at every predetermined time period. Note that a counter C2 is cleared by the initial routine. At step 901, it is determined whether or not the sensing output voltage $V_Q$ is high. If $V_Q$ is high, the flow advances to step 902 which sets a flag F and, then at step 903, the counter C2 is counted up by 1. Thus, this routine is completed by step 911. Note that the flag F (="1") as shown in FIG. 10A shows the state of the flip-flop 704 set by a 180° CA. signal of the crank angle sensor 14 as shown in FIG. 10A.

Next, when the flip-flop 704 is reset by the output of the OR circuit 704 as shown in FIG. 10B, the sensing output voltage $V_Q$ is also changed from high to low. Therefore, when the routine of FIG. 9 is again carried out, the flow at step 901 advances to step 904 which determines whether or not the flag F is "1". In this case, F="1", and accordingly, the flow advances to step 905 which clears the flag F. Then, at step 906, the CPU 113 calculates the intake air amount Q by using a function g(C2), and the calculated amount Q is stored in the RAM 115 by step 907. Further, at step 908, an A/D conversion is performed up on the angle TA of the throttle valve 5, i.e., the output of the throttle opening sensor 13, and at step 909, the throttle angle data TA is stored on the RAM 115. Then, at step 910, the counter C2 is cleared.

When the routine of FIG. 9 is further carried out, the flow at step 901 advances via step 904 directly to step 910 which clears the counter C2, since the flag F is "0".

Thus, the above-mentioned operation is repeated by every 180° CA. signal of the crank angle sensor 14.

In this case, the fuel injection amount TAU is also calculated by using the flowchart of FIG. 6.

Note that the present invention can be applied to flow rate sensors other than airflow meters, such as liquid flow rate sensors.

As explained above, according to the present invention, in an abnormal state where the temperature within the measured passage is extremely high, the power supply for the film resistor is stopped, thereby preventing the film resistor from being overheated.

We claim:

1. A direct-heated flow measuring apparatus for measuring the flow rate within a passage, comprising:

an electric heater of a film resistor type disposed within said passage;

a temperature-dependent resistor, disposed within said passage, for detecting the temperature thereof;

means for measuring the flow rate within said passage in accordance with the temperature of said electric heater and the temperature of said temperature-dependent resistor;

means for determining whether or not the temperature within said passage is abnormal in accordance with a temperature of one of:
 (a) said electric heater, and
 (b) said temperature dependant resistor; and means for stopping the operation of said flow rate measuring means when the temperature within said passage is abnormal.

2. An apparatus as set forth in claim 1, wherein said determining means comprises comparing means for comparing the temperature of said temperature-dependent resistor with a predetermined value, thereby determining that the temperature within said passage is abnormal when the temperature of said temperature-dependent resistor is higher than said predetermined value.

3. An apparatus as set forth in claim 1, wherein said determining means comprises comparing means for comparing the temperature of said electric heater with a predetermined value, thereby determining that the temperature within said passage is abnormal when the temperature of said electric heater is higher than said predetermined value.

4. An apparatus as set forth in claim 1, wherein said flow rate measuring means comprises:

a bridge circuit including said electric heater and said temperature-dependent resistor;

detecting means, connected to diagonal points of said bridge circuit, for detecting whether or not the temperature of said electric heater is higher than the temperature of said temperature-dependent resistor by a predetermined value; and feedback means, connected to said comparator and said bridge circuit, for controlling the voltage applied to said bridge circuit so that the difference in temperature between said electric heater and said temperature-dependent resistor is said predetermined value, thereby generating the voltage applied to said bridge circuit as the flow rate.

5. An apparatus as set forth in claim 4, wherein said stopping means comprises means for forcibly reducing the voltage applied to said bridge circuit, when the temperature within said passage is abnormal.

6. An apparatus as set forth in claim 1, wherein said flow rate measuring means comprises:

a bridge circuit including said electric heater and said temperature-dependent resistor;

means for generating a trigger signal;

detecting means, connected to diagonal points of said bridge circuit, for detecting whether or not the temperature of said electric heater is higher than the temperature of said temperature-dependent resistor by a predetermined value; and a constant-voltage generating circuit, connected to said trigger signal generating means, said detecting circuit, and said bridge circuit, for generating a constant voltage and applying said constant voltage to said bridge circuit, said constant-voltage generating circuit being set by said trigger signal and reset by said detecting circuit, thereby generating as the flow rate a time period for which said constant-voltage generating circuit is being set.

7. An apparatus as set forth in claim 6, wherein said stopping means comprises means for forcibly resetting said constant-voltage generating circuit, when the temperature within said passage is abnormal.

8. An apparatus as in claim 1 wherein said determining means compares a temperature of one of said electric heater and said temperature dependent resistor with a predetermined value, and detects that the temperature within said passage is abnormal when said temperature that is compared is higher than said predetermined value.

9. A method for measuring a flow rate within a passage, comprising the steps of:

disposing an electric heater of a film resistor type within said passage;

disposing a temperature dependent resistor within said passage, from which the temperature thereof can be determined;

measuring the flow rate within said passage in accordance with the temperature of said electric heater and the temperature of said temperature dependent resistor;

comparing the temperature of one of said resistors with a predetermined value to thereby determine that the temperature within said passage is abnormal when the temperature of said one of said resistors is higher than said predetermined value; and stopping the operation when said temperature in said passage is abnormal.

10. A method as in claim 9 wherein said comparing step compares the temperature of said temperature-dependent resistor with said predetermined value.

11. A method as in claim 9 wherein said comparing step compares the temperature of said electric heater with the predetermined value.

12. A direct-heated flow measuring apparatus for measuring the flow rate within a passage, comprising:

an electric heater of a film resistor type disposed within said passage;

a temperature-dependent resistor, disposed within said passage, for detecting the temperature thereof;

means for measuring the flow rate within said passage in accordance with the temperature of said electric heater and the temperature of said temperature-dependent resistor;

means for determining whether or not the temperature within said passage is abnormal, said determining means comprising comparing means for comparing the temperature of said temperature-dependent resistor with a predetermined value, thereby determining that the temperature within said passage is abnormal when the temperature of said temperature-dependent resistor is higher than said predetermined value; and means for stopping the operation of said flow rate measuring means when the temperature within said passage is abnormal.

13. A direct-heated flow measuring apparatus for measuring the flow rate within a passage, comprising:

an electric heater of a film resistor type disposed within said passage;

a temperature-dependent resistor, disposed within said passage, for detecting the temperature thereof;

means for measuring the flow rate within said passage in accordance with the temperature of said electric heater and the temperature of said temperature-dependent resistor;

means for determining whether or not the temperature within said passage is abnormal said determining means comprising comparing means for comparing temperature of said electric heater with a predetermined value, thereby determining that the temperature within said passage is abnormal when the temperature of said electric heater is higher than said predetermined value; and means for stopping the operation of said flow rate measuring means when the temperature within said passage is abnormal.

14. A direct-heated flow measuring apparatus for measuring the flow rate within a passage, comprising:
   an electric heater of a film resistor type disposed within said passage;
   a temperature-dependent resistor, disposed within said passage, for detecting the temperature thereof;
   means for measuring the flow rate within said passage in accordance with the temperature of said electric heater and the temperatue of said temperature-dependent resistor said flow rate measuring means comprising:
   (a) a bridge circuit including said electric heater and said temperature-dependent resistor;
   (b) detecting means connected to diagonal points of said bridge circuit, for detecting whether or not the temperature of said electric heater is higher than the temperature of said temperature-dependent resistor by a predetermined value; and
   (c) feedback means connected to said detecting means and said bridge circuit, for controlling the voltage applied to said bridge circuit so that the difference in temperature between said electric heater and said temperature-dependent resistor is said predetermined value, thereby generating the voltage applied to said bridge circuit as the flow rate.

15. An apparatus as set forth in claim 14 wherein said stopping means comprises means for forcibly reducing the voltage applied to said bridge circuit, when the temperature within said passage is abnormal.

16. A direct-heated flow measuring apparatus for measuring the flow rate within a passage, comprising:
   an electric heater of a film resistor type disposed within said passage;
   a temperature-dependent resistor, disposed within said passage, for detecting the temperature thereof;
   means for measuring the flow rate within said passage in accordance with the temperature of said electric heater and the temperature of said temperature-dependent resistor;
   (a) a bridge circuit including said electric heater and said temperature-dependent resistor;
   (b) means for generating a trigger signal;
   (c) detecting means connected to diagonal points of said bridge circuit, for detecting whether or not the temperature of said electric heater is higher than the temperature of said temperature-dependent resistor by a predetermined value; and
   (d) a constant-voltage generating circuit, connected to said trigger signal generating means, said detecting circuit, and said bridge circuit, for generating a constant voltage and applying said constant voltage to said bridge circuit, said constant-voltage generating circuit being set by said trigger signal and reset by said detecting circuit, thereby generating as the flow rate a time period for which said constant-voltage generating circuit is being set;
   means for determining whether or not the temperature within said passage is abnormal;
   means for stopping the operation of said flow rate measuring means when the temperature within said passage is abnormal.

17. An apparatus as set forth in claim 16, wherein said stopping means comprises means for forcibly resetting said constant-voltage generating circuit, when the temperature within said passage is abnormal.

* * * * *